United States Patent
Oliveira et al.

(10) Patent No.: US 11,912,405 B2
(45) Date of Patent: Feb. 27, 2024

(54) VERTICAL AND SHORT TAKEOFF AND LANDING (VSTOL) AIRCRAFT

(71) Applicant: EMBRAER S.A., São José dos Campos—SP (BR)

(72) Inventors: Luiz Fernando Tedeschi Oliveira, São José dos Campos—SP (BR); Carlos Eduardo de Carvalho, São José dos Campos—SP (BR); Jay Beever, São José dos Campos—SP (BR)

(73) Assignee: EMBRAER S.A., São José dos Campos—SP (BR)

( * ) Notice: Subject to any disclaimer, the term of this patent is extended or adjusted under 35 U.S.C. 154(b) by 147 days.

(21) Appl. No.: 17/282,281

(22) PCT Filed: Oct. 2, 2018

(86) PCT No.: PCT/BR2018/000060
§ 371 (c)(1),
(2) Date: Apr. 1, 2021

(87) PCT Pub. No.: WO2020/069582
PCT Pub. Date: Apr. 9, 2020

(65) Prior Publication Data
US 2021/0354816 A1   Nov. 18, 2021

(51) Int. Cl.
*B64C 29/00* (2006.01)
*B64C 23/06* (2006.01)
(Continued)

(52) U.S. Cl.
CPC ............ *B64C 29/0033* (2013.01); *B64C 5/06* (2013.01); *B64C 23/069* (2017.05); *B64C 37/02* (2013.01); *B64C 39/068* (2013.01)

(58) Field of Classification Search
CPC ...... B64C 29/0033; B64C 37/00; B64C 37/02
See application file for complete search history.

(56) References Cited

U.S. PATENT DOCUMENTS 3,017,137 A * 1/1962 Helmke ................. B64C 37/00
244/120
3,089,666 A * 5/1963 Quenzler ............ B64C 29/0033
244/66
(Continued)

FOREIGN PATENT DOCUMENTS

| WO | 2015/143093 | 9/2015 |
| WO | 2015/200345 | 12/2015 |
| WO | 2017/158417 | 9/2017 |

OTHER PUBLICATIONS

International Search Report for PCT/BR2018/000060 dated Jul. 15, 2019, 5 pages.
(Continued)

*Primary Examiner* — Tien Q Dinh
*Assistant Examiner* — William L Gmoser
(74) *Attorney, Agent, or Firm* — NIXON & VANDERHYE P.C.

(57) ABSTRACT

Vertical short takeoff and landing (VSTOL) aircraft include primary airfoils extending outwardly from a forward region of the aircraft fuselage, and secondary empennage airfoils extending outwardly from an aft region of the aircraft fuselage so as to be separated from the forward primary airfoils and thereby define a space therebetween which accommodates non-cyclic controllable propellers operably driven by a respective engine of a propulsion unit. The propulsion units are mounted for pivotal movement within the defined space between the primary airfoil and the secondary empennage airfoils so as to achieve a first operational position wherein the thrust line of the propellers is orientated substantially parallel to the longitudinal axis of the fuselage and a second operational position wherein the thrust line of the propellers is oriented substantially perpendicular to the longitudinal axis of the aircraft. The propul- (Continued)

sion units may be mounted aft of the aircraft center of gravity (CG).

16 Claims, 16 Drawing Sheets

(51) Int. Cl.
*B64C 5/06* (2006.01)
*B64C 37/02* (2006.01)
*B64C 39/06* (2006.01)

(56) References Cited

U.S. PATENT DOCUMENTS

| | | | | |
|---|---|---|---|---|
| 3,605,935 | A * | 9/1971 | Gilbert | B60F 1/00 296/35.3 |
| 4,358,072 | A * | 11/1982 | Williamson | B64C 37/00 244/234 |
| 5,465,923 | A * | 11/1995 | Milner | B64D 5/00 244/137.4 |
| 5,839,691 | A * | 11/1998 | Lariviere | B64C 29/0033 244/17.23 |
| 6,896,221 | B1 * | 5/2005 | Einarsson | B64C 5/08 244/12.4 |
| 9,499,266 | B1 * | 11/2016 | Garreau | B64C 9/00 |
| 2017/0174342 | A1 | 6/2017 | Huang | |
| 2018/0354613 | A1 * | 12/2018 | Cvrlje | B64D 27/24 |
| 2020/0223542 | A1 * | 7/2020 | Moore | B64C 3/38 |
| 2020/0247525 | A1 * | 8/2020 | Manterola Ottonello | B64C 3/16 |

OTHER PUBLICATIONS

Written Opinion of the ISA for PCT/BR2018/000060 dated Jul. 15, 2019, 10 pages.

* cited by examiner

VERTICAL AND SHORT TAKEOFF AND LANDING (VSTOL) AIRCRAFT

CROSS-REFERENCE TO RELATED APPLICATION

This application is the U.S. national phase of International Application No. PCT/BR2018/000060 filed Oct. 2, 2018 which designated the U.S. and is related to commonly owned U.S. Design patent application Ser. No. 29/665,290 filed Oct. 2, 2018 (now U.S. Pat. No. D920,214), the entire contents of which are expressly incorporated hereinto by reference.

FIELD

The embodiments disclosed herein relate generally to aircraft that are capable of vertical and short takeoff and landing (VSTOL) operations. Further embodiments relate to aircraft which may be provided with a separable occupant cabin component that is convertible to a roadable vehicle to provide ground transportation.

BACKGROUND

Air transport efficiency as measured by block time to final destination compared to air travel time is negatively affected by other transport modalities used to access airports and the check-in/boarding procedures necessary to process a large number of passengers using the current large scale airport operations.

Fuel efficient VSTOL aircraft are an attractive alternative to the conventional air travel model of using relatively large fixed wing aircraft operating in the current large airport operations systems. Such VSTOL aircraft may therefore lead to smaller scale operations between traffic generating city points thereby considerably reducing the time spent by passengers to access airports which in turn will allow faster passenger processing and an improvement in final destination block times.

Tilt rotor fixed wing aircraft are suitable for this application, using vertical thrust from rotors to take off and land and efficient wing borne flight for cruise. However, there are significant technical problems that are encountered when using conventional tilt rotor fixed wing aircraft. For example a vertical takeoff and landing tilt rotor aircraft without cyclic control for the rotors which allow alignment of the rotor thrust vector with the center of gravity (CG) of the aircraft will cause the aircraft to assume a pitch attitude in hover flight that is a consequence of such thrust vector misalignment. The assumed pitch attitude may in fact be sufficiently drastic as to exceed the tilt range capability of the rotors and/or be much too uncomfortable for the aircraft occupants.

It is therefore towards resolving such technical problems attributable to conventional VSTOL aircraft that the embodiments of the invention described herein are directed. The embodiments described herein are also directed toward improving destination block times by providing the aircraft with an occupant cabin that may be converted to a roadable vehicle for passenger ground transport.

SUMMARY

Exemplary embodiments disclosed herein relate generally to aircraft that are capable of vertical and short takeoff and landings known colloquially as VSTOL aircraft. In other embodiments, aircraft (which may but are not necessarily required to be VSTOL aircraft) are provided whereby an aircraft occupant cabin is detachably mounted to the fuselage so as to be capable of being separated therefrom and becoming a roadable vehicle upon providing a wheeled carriage.

According to certain VSTOL aircraft embodiments, the aircraft will include primary airfoils extending outwardly from a forward region of the aircraft fuselage, and secondary empennage airfoils extending outwardly from an aft region of the aircraft fuselage so as to be separated from the forward primary airfoils and thereby define a space therebetween so as to accommodate propellers operably driven by a respective engine of a propulsion unit. The propulsion units are mounted for pivotal movement within the defined space between the primary airfoil and the secondary empennage airfoils so as to achieve a first operational position wherein the thrust line of the propellers is orientated substantially parallel to the longitudinal axis of the fuselage and a second operational position wherein the thrust line of the propellers is oriented substantially perpendicular to the longitudinal axis of the aircraft.

Each of the port and starboard airfoil assemblies may comprise primary airfoils extending outwardly from a forward region of the aircraft fuselage, and secondary empennage airfoils extending outwardly from an aft region of the aircraft fuselage. The secondary empennage airfoil is separated from the primary airfoils along the longitudinal axis of the aircraft so as to define a space therebetween. Each of the port and starboard propulsion units may comprise an engine and propellers operably driven by the engine to provide thrust to the aircraft along a thrust line. The engine and propellers are mounted for pivotal movement within the defined space between the primary airfoil and the secondary empennage airfoils so as to achieve a first operational position wherein the thrust line of the propellers is orientated substantially parallel to the longitudinal axis of the fuselage and a second operational position wherein the thrust line of the propellers is oriented substantially perpendicular to the longitudinal axis of the aircraft.

Some embodiments of the VSTOL aircraft will include winglets connecting respective terminal ends of the primary airfoils and secondary empennage airfoils so as to provide a lateral boundary to the space defined therebetween.

According to some embodiments, each of the port and starboard airfoil assemblies of the VSTOL aircraft may further comprise a pivotable intermediate airfoil extending in the defined space between the primary airfoil and secondary empennage airfoil. In such embodiments, each of port and starboard propulsion units is operably supported by a respective intermediate airfoil so as to be pivotable therewith between the first and second operational positions.

Alternatively, certain embodiments of the invention will include port and starboard airfoil assemblies which include pivotable secondary empennage airfoils. Each of the port and starboard propulsion units is thus operably supported by a respective secondary empennage airfoil so as to be pivotable therewith between the first and second operational positions.

It is preferred that each of the port and starboard propulsion assemblies is preferably mounted within such bounded space at a position which is aft of the aircraft center of gravity (CG).

Another aspect of the embodiments described herein is that an aircraft (which may or may not be a VSTOL aircraft) may be provided with a roadable occupant cabin. Such an aircraft will include an elongate aircraft fuselage and a cabin component for aircraft occupants which is detachably mounted to the aircraft fuselage so as to allow separation of the cabin component from the fuselage. A wheeled cradle assembly is removably attachable to the cabin component to allow the cabin component to be roadable upon separation from the fuselage. In certain embodiments, the cradle assembly includes a pair of driven wheels to propel the cabin along a surface when the cabin component is separated from the fuselage and roadable. The detachably mounted cabin component may include retractable aft road wheels that are deployable to allow the cabin component to be moved away from the aircraft fuselage.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 1-4 depict an embodiment of a vertical and short takeoff and landing (VSTOL) aircraft according to the invention wherein FIGS. 1 and 2 are perspective views and FIGS. 3 and 4 are side elevational views showing the aircraft in horizontal and vertical flight modes, respectively;

FIGS. 5-8 depict another embodiment of a vertical and short takeoff and landing (VSTOL) aircraft according to the invention wherein FIGS. 5 and 6 are perspective views and FIGS. 7 and 8 are side elevational views showing the aircraft in horizontal and vertical flight modes, respectively;

Figure 9:
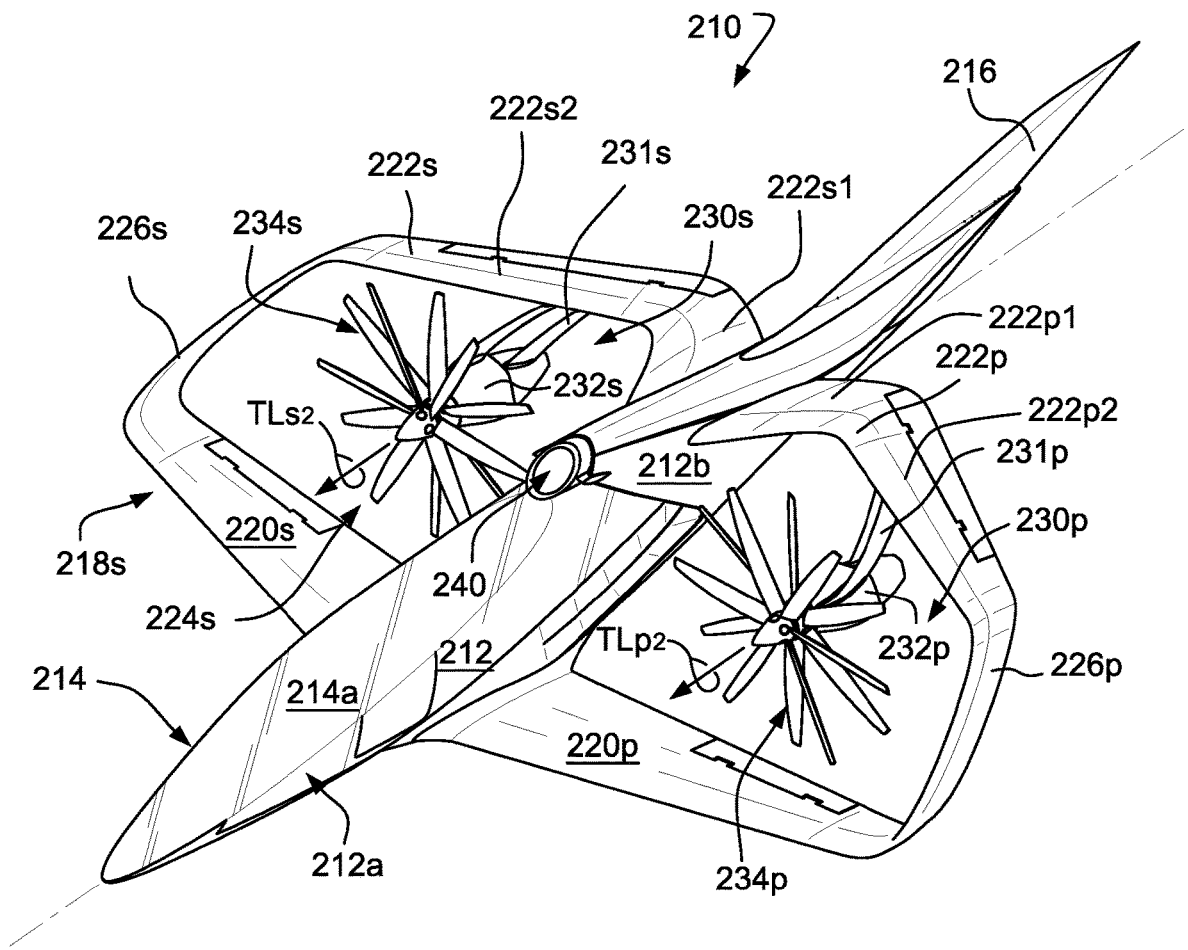
Figure 10:
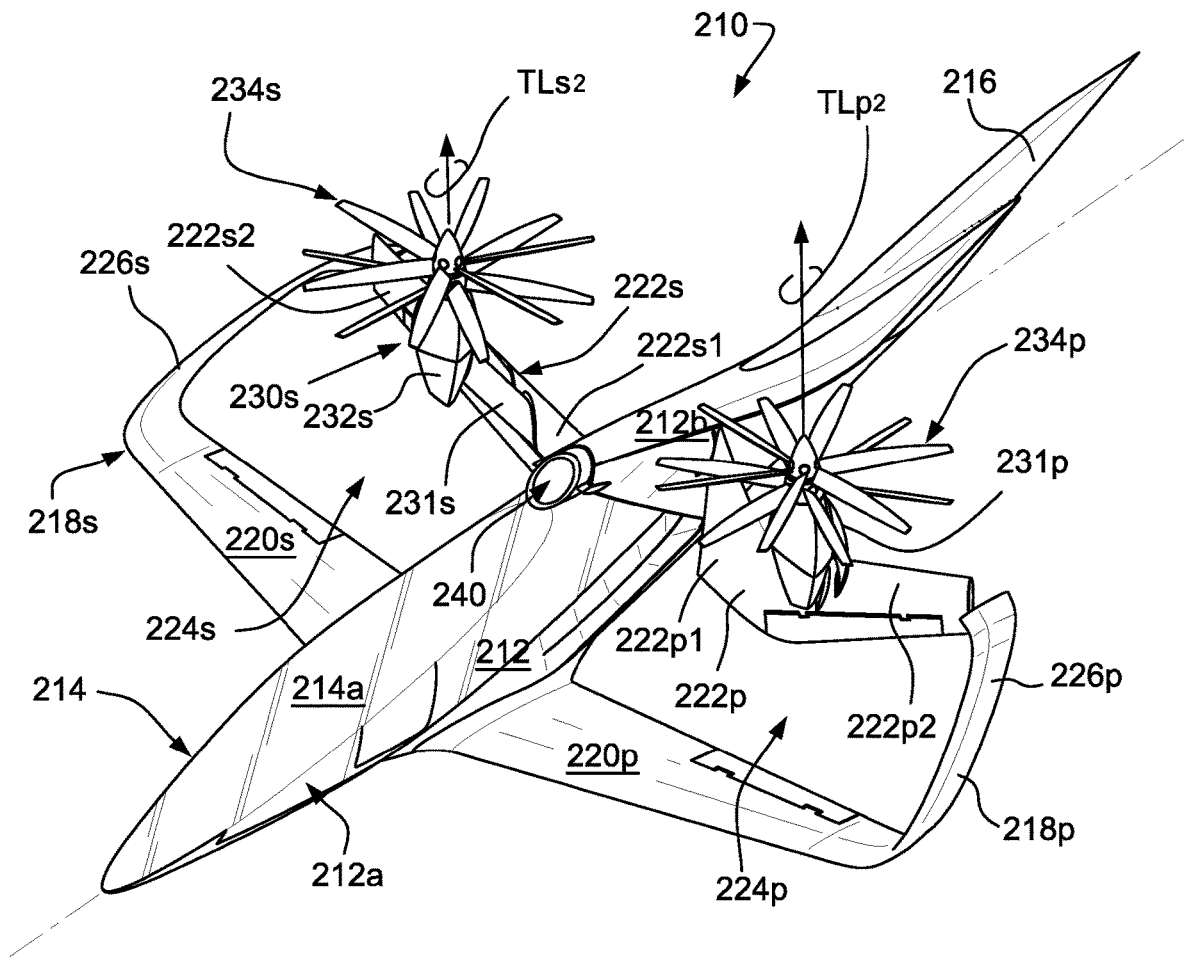
Figure 11:
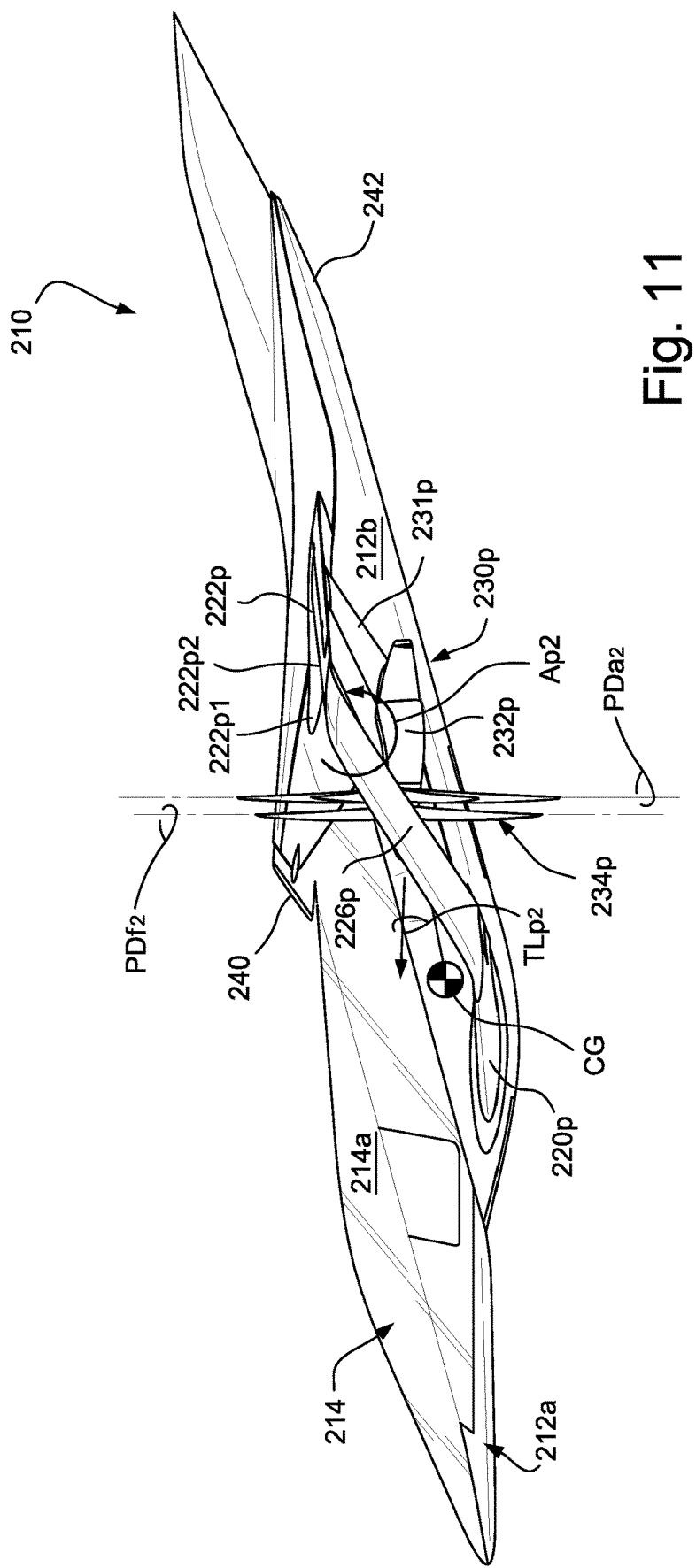
Figure 12:
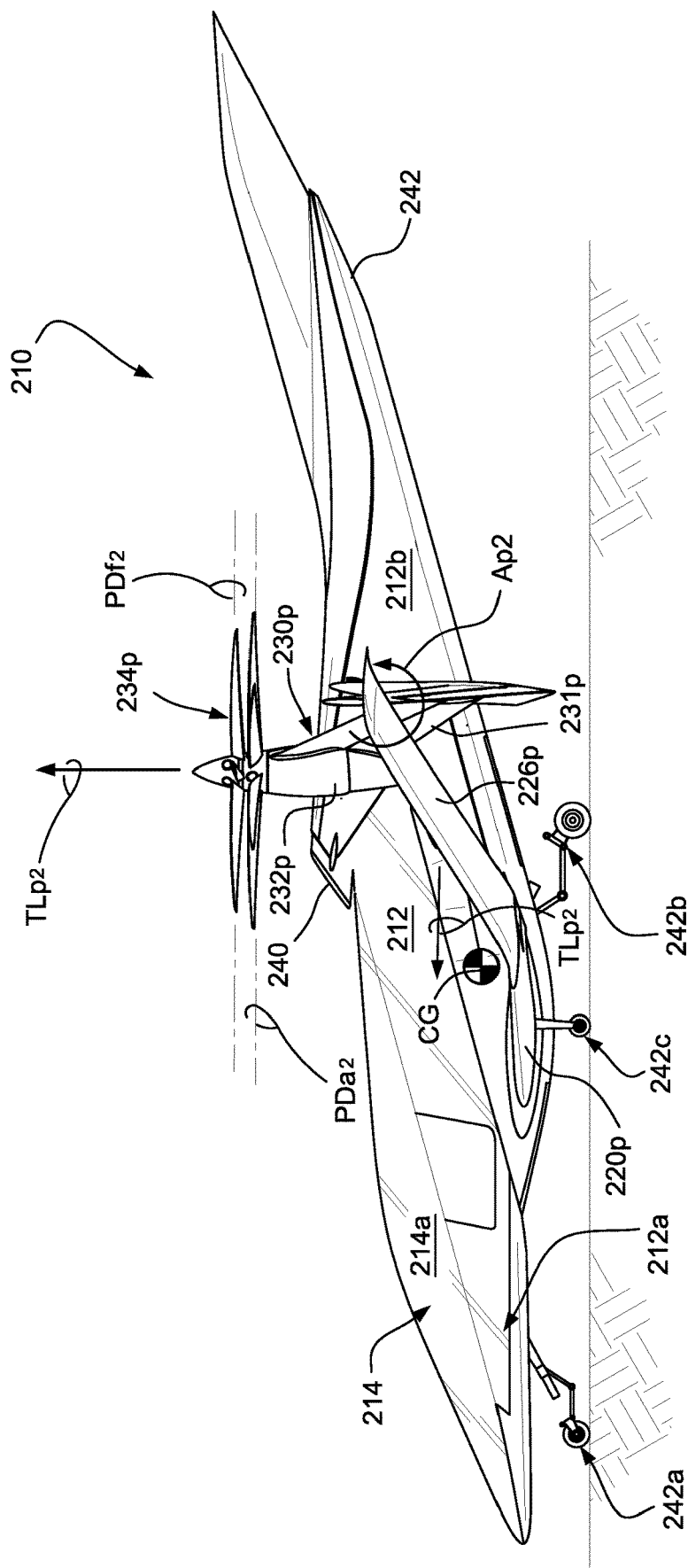
Figure 13:
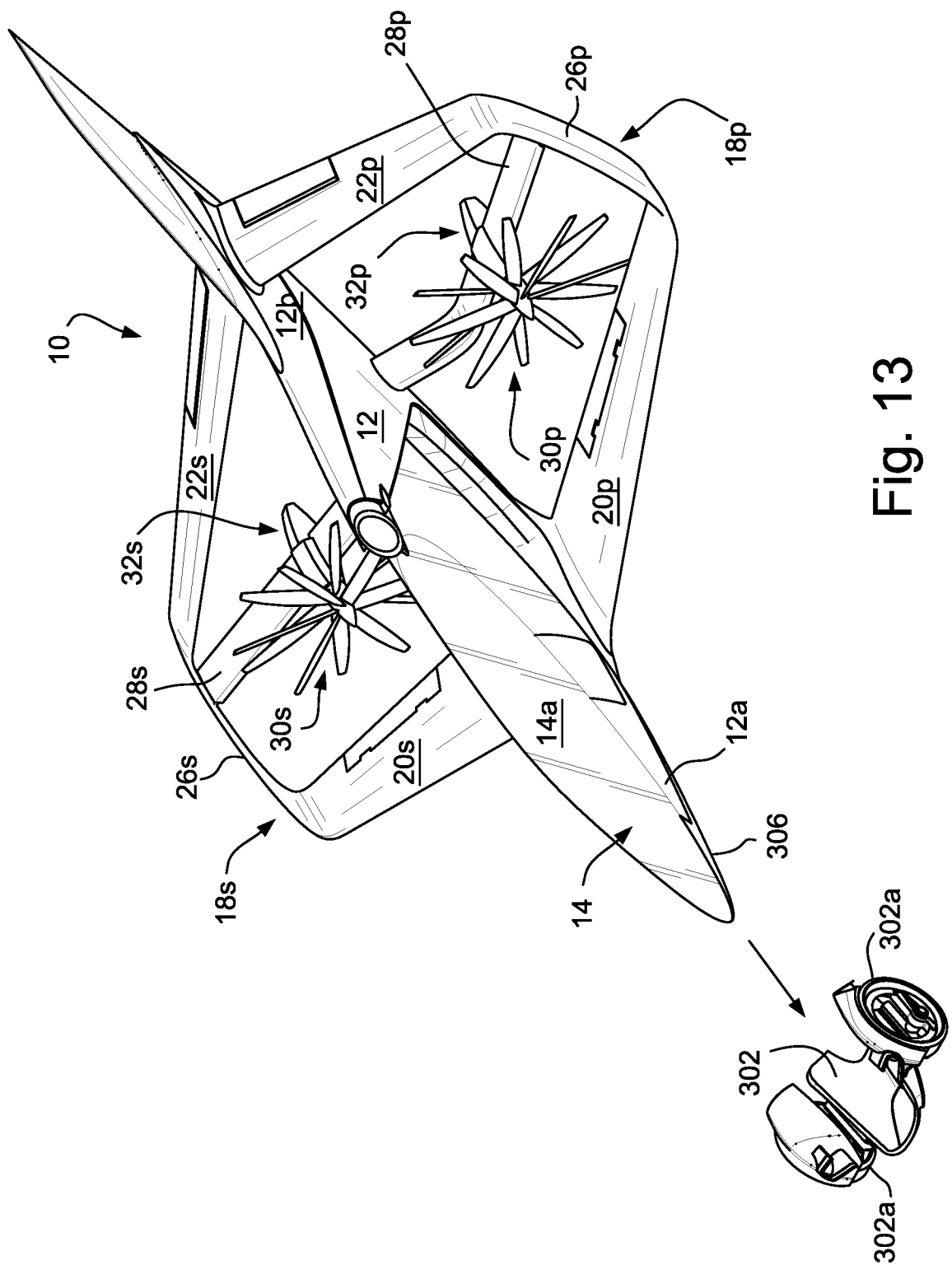
Figure 14:
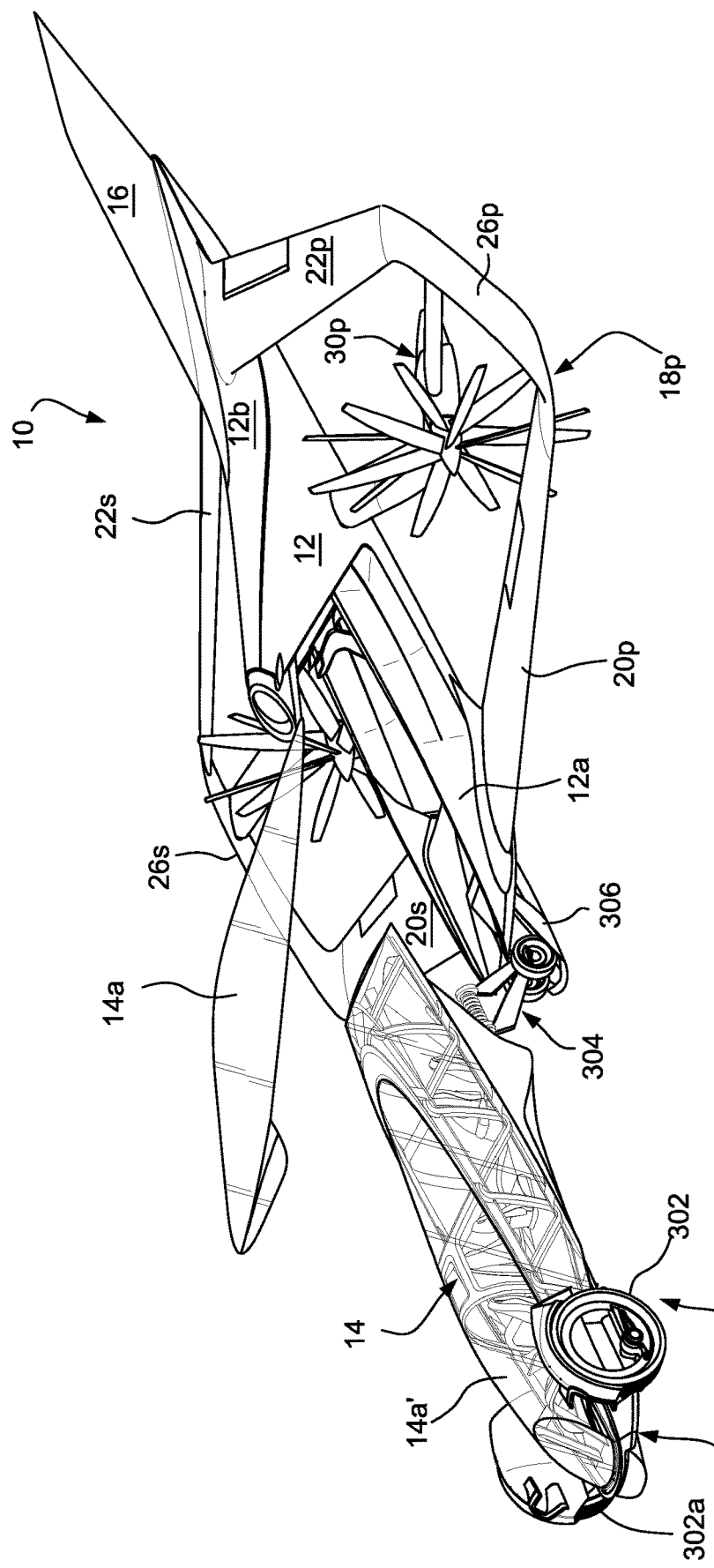
Figure 15:
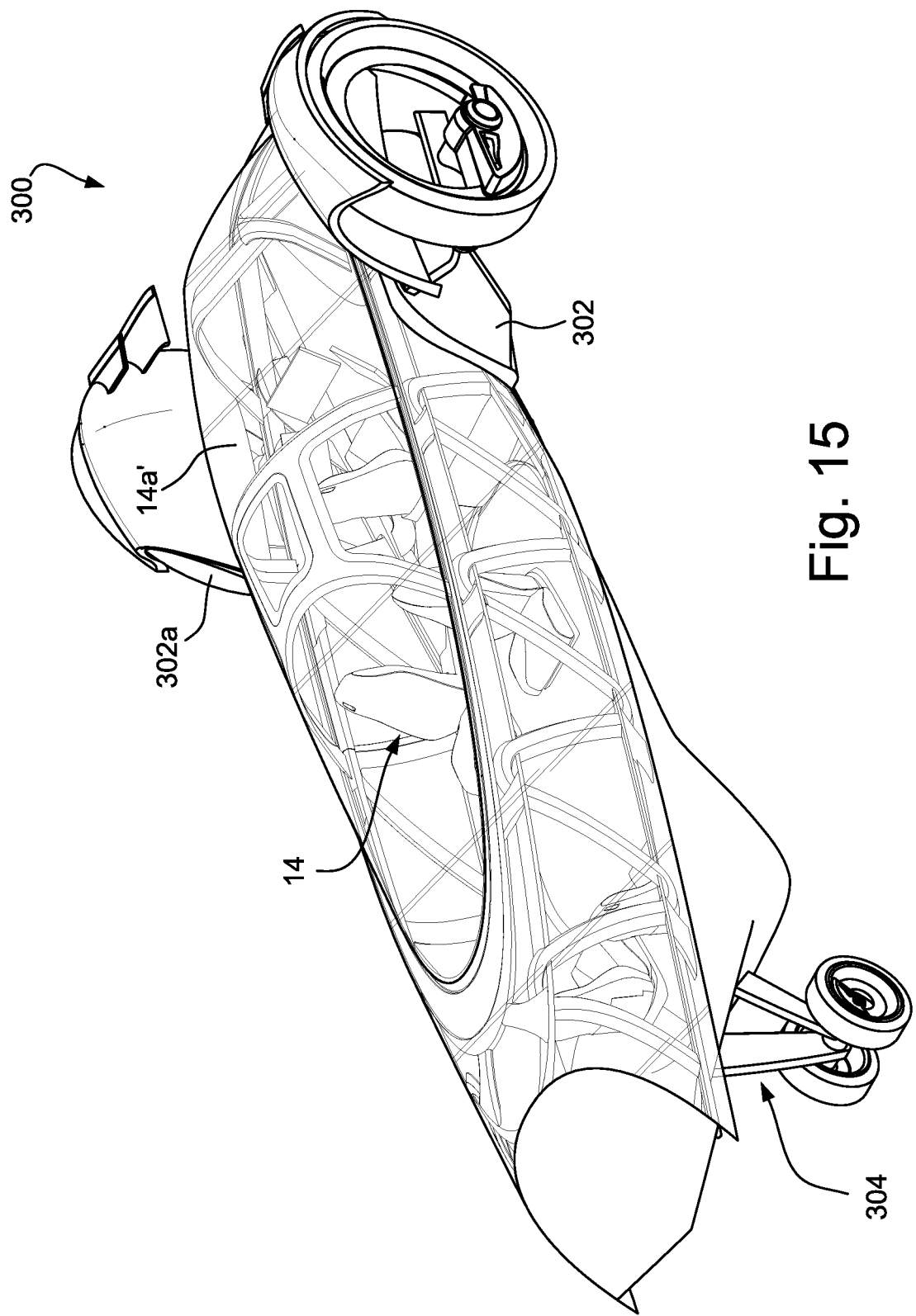
Figure 16:
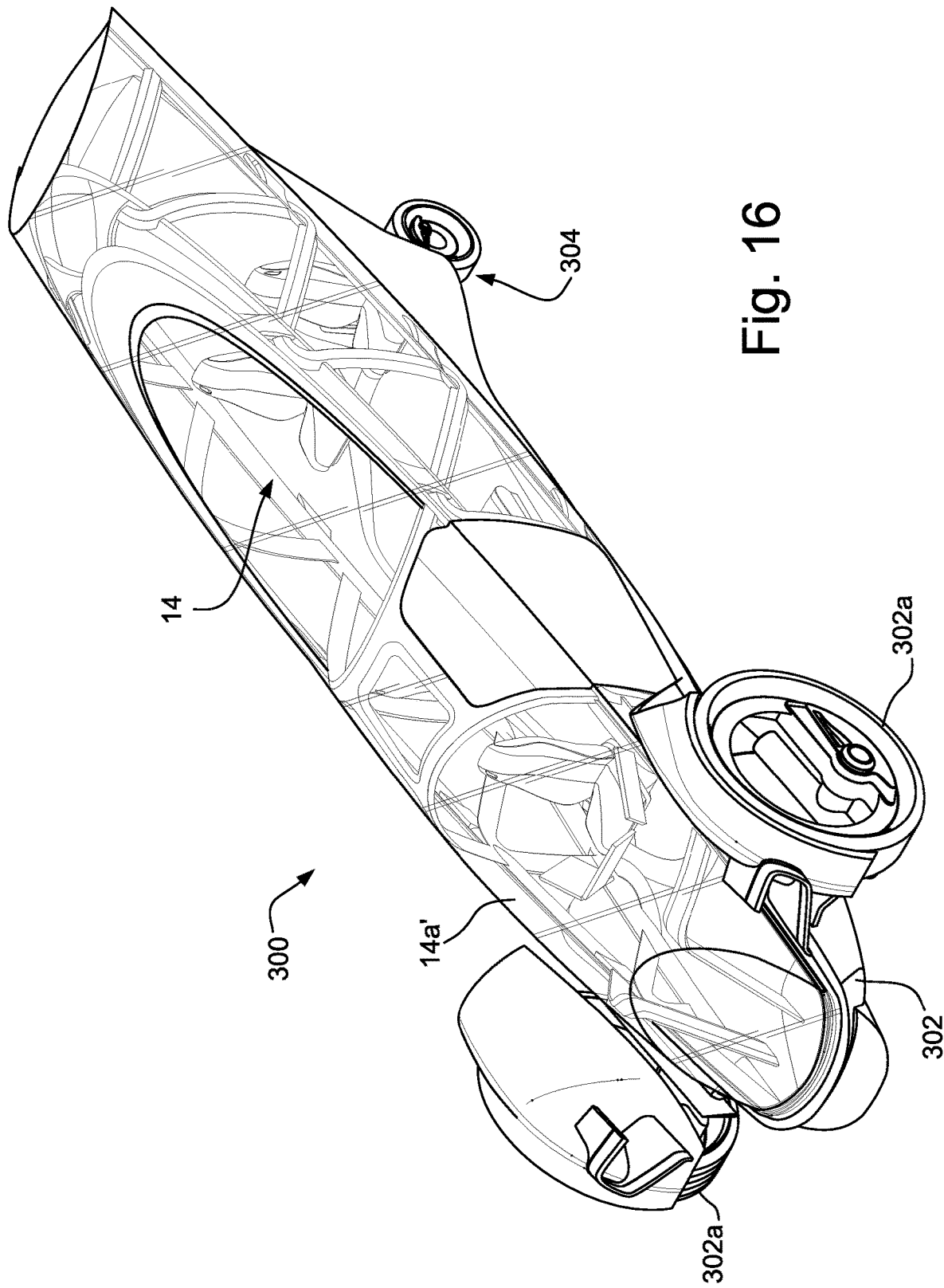

FIGS. 9-12 depict yet another embodiment of a vertical and short takeoff and landing (VSTOL) aircraft according to the invention wherein FIGS. 9 and 10 are perspective views and FIGS. 11 and 12 are side elevational views showing the aircraft in horizontal and vertical flight modes, respectively; and FIGS. 13-16 are perspective views showing a detachable cabin component of the aircraft in accordance with the invention being a converted to a roadable vehicle wherein FIGS. 13 and 14 are perspective views showing the detachable cabin being operably connected to a wheeled cradle assembly and FIGS. 15 and 16 are rear and front perspective views, respectively, of the resulting roadable vehicle.

DETAILED DESCRIPTION

An embodiment of a vertical and short takeoff and landing (VSTOL) aircraft 10 according to the invention is depicted in FIGS. 1-4. In this regard, the aircraft 10 depicted in FIGS. 1-4 will include an elongate fuselage 12 which defines a central elongate axis Ac for the aircraft 10. The fuselage 12 includes an occupant cabin 14 which is covered by a transparent canopy 14a at a forward portion 12a of the fuselage 12 and a vertical stabilizer 16 extending upwardly from an aft empennage region 12b of the fuselage 12. The stabilizer 16 may be pivotally movable so as to provide yaw axis rudder control to the aircraft.

The aircraft 10 also includes port and starboard airfoil (wing) assemblies 18p, 18s which include fixed position port and starboard primary airfoils 20p, 20s extending outwardly from the forward region 12a of the fuselage 12 and fixed position port and starboard secondary empennage airfoils 22p, 22s extending outwardly from the aft empennage region 12b of the fuselage 12, respectively. A space 24p, 24s is therefore respectively defined between each of the port and starboard primary airfoils 20p, 20s and the associated port and starboard secondary empennage airfoils 22p, 22s. Port and starboard winglets 26p, 26s integrally join the respective terminal ends of the port and starboard primary airfoils 20p, 20s and the associated port and the terminal ends of the starboard secondary empennage airfoils 22p, 22s to thereby establish a lateral structural boundary to the defined spaces 24p, 24s, respectively.

Port and starboard intermediate airfoils 28p, 28s are pivotally connected at a proximal end to the fuselage 12 and at a distal end to a respective one of the winglets 26p, 26s so as to be capable of reciprocal pivotal movements (arrows Ap in FIGS. 3 and 4) about a substantially horizontal pivot axis thereof. Port and starboard propulsion units 30p, 30s are respectively supported by the pivotable intermediate airfoils 28p, 28s and respectively include an engine 32p, 32s and coaxially counter-rotatable sets of non-cyclic controlled but constant speed selectable propeller blades 34p, 34s each defining forward and aft propeller disc planes PDf, PDa (see FIGS. 3 and 4). The propeller discs planes PDf, PDa thereby establish thrust lines TLp, TLs for each of the port and starboard coaxially counter-rotatable sets of propeller blades 34p, 34s, respectively. The propwash from the propeller blades 34p, 34s will moreover flow across the respective intermediate airfoils 28p, 28s so as to provide lift component in relation of the pivot angle thereof. In order to provide a balancing moment to the center of gravity (CG) (see FIGS. 3 and 4) and misalignment of the thrust lines TLp, TLs, the airfoil shape of the intermediate airfoils 28p, 28s aft of the rotor plane of the discs PDf, PDa will have its zero lift angle adjusted with respect of the thrust lines TLp, TLs and will use the rotor wash dynamic pressure and angle to create lift and drag forces made necessary by such adjustment. The aircraft flight control system (not shown) will therefore adjust the zero lift line of the intermediate airfoils 28p, 28s with respect of the thrust lines TLp, TLs, respectively, to maintain the selected attitude of the aircraft during hover and transition to wing borne level flight. In such a manner, therefore, the aircraft 10 is provided with enhanced stability during transitions between vertical and horizontal flight modes.

Figure 1:
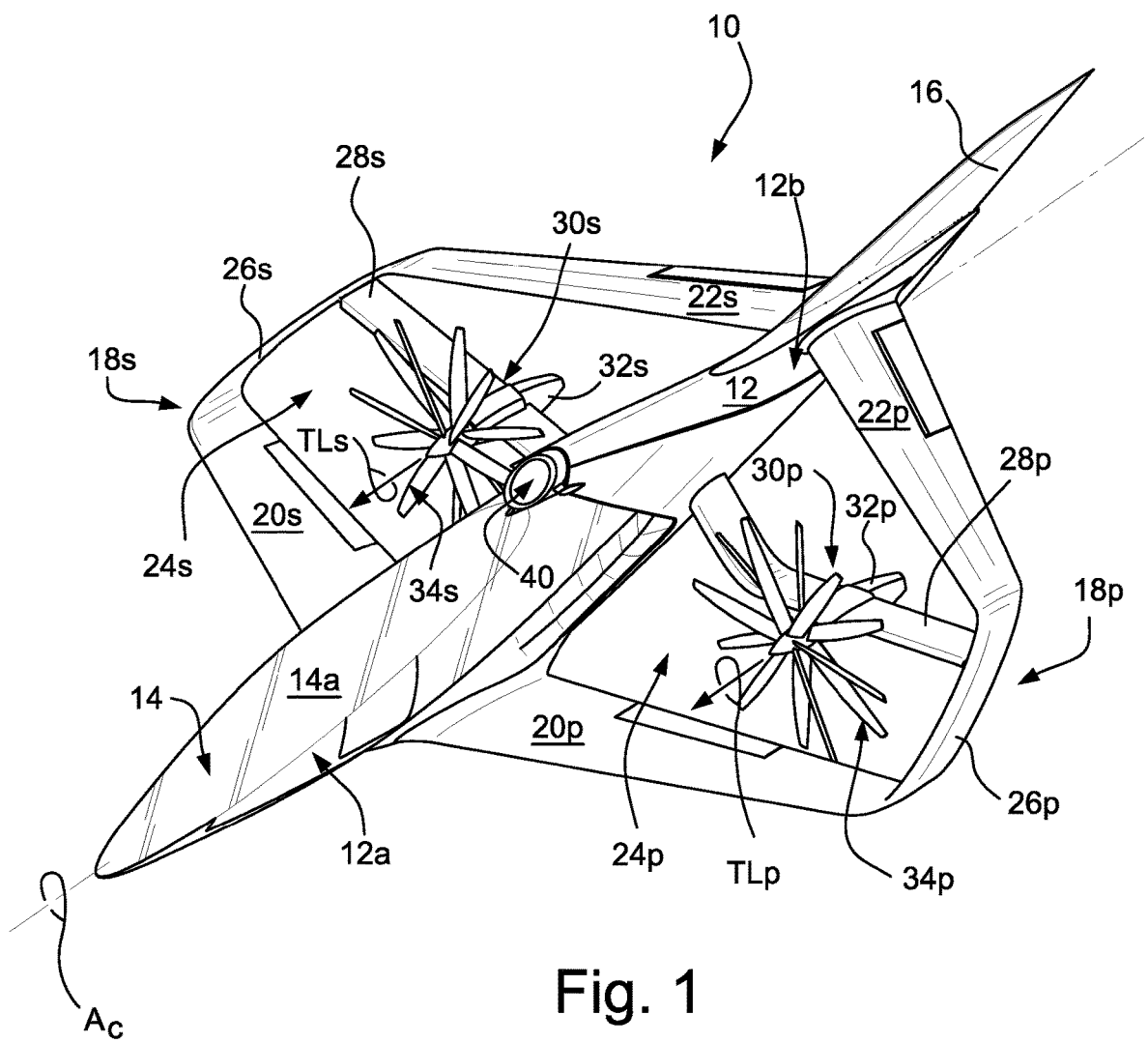
Figure 2:
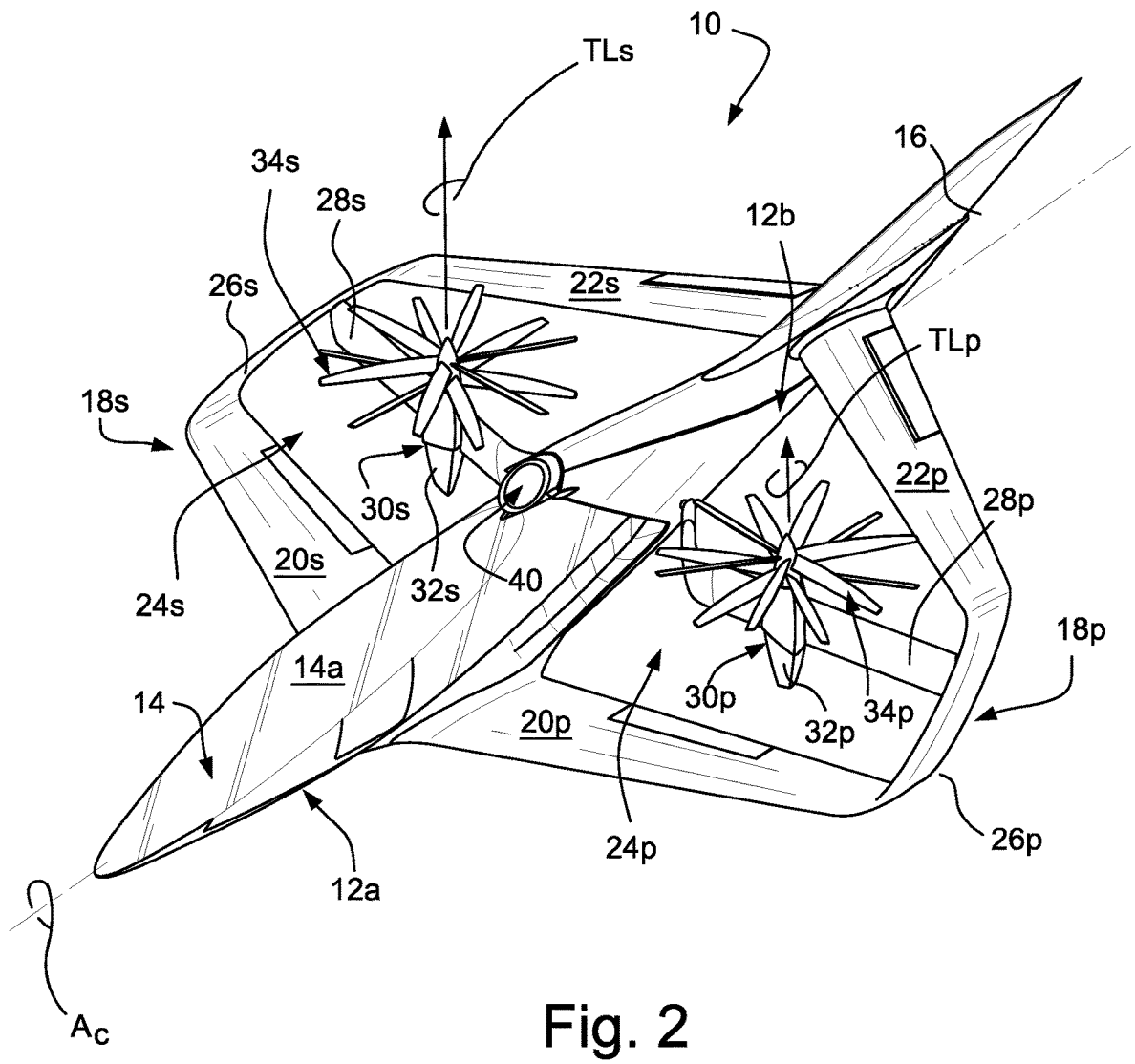
Figure 3:
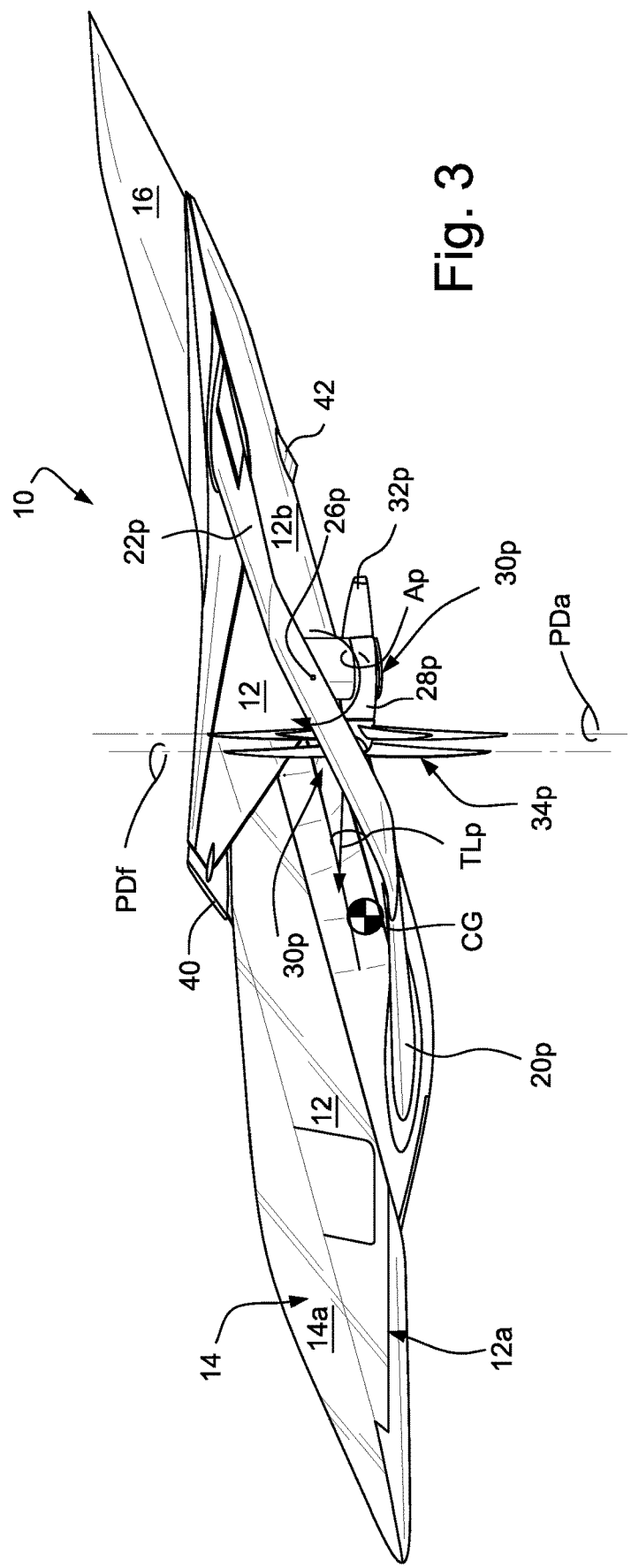
Figure 4:
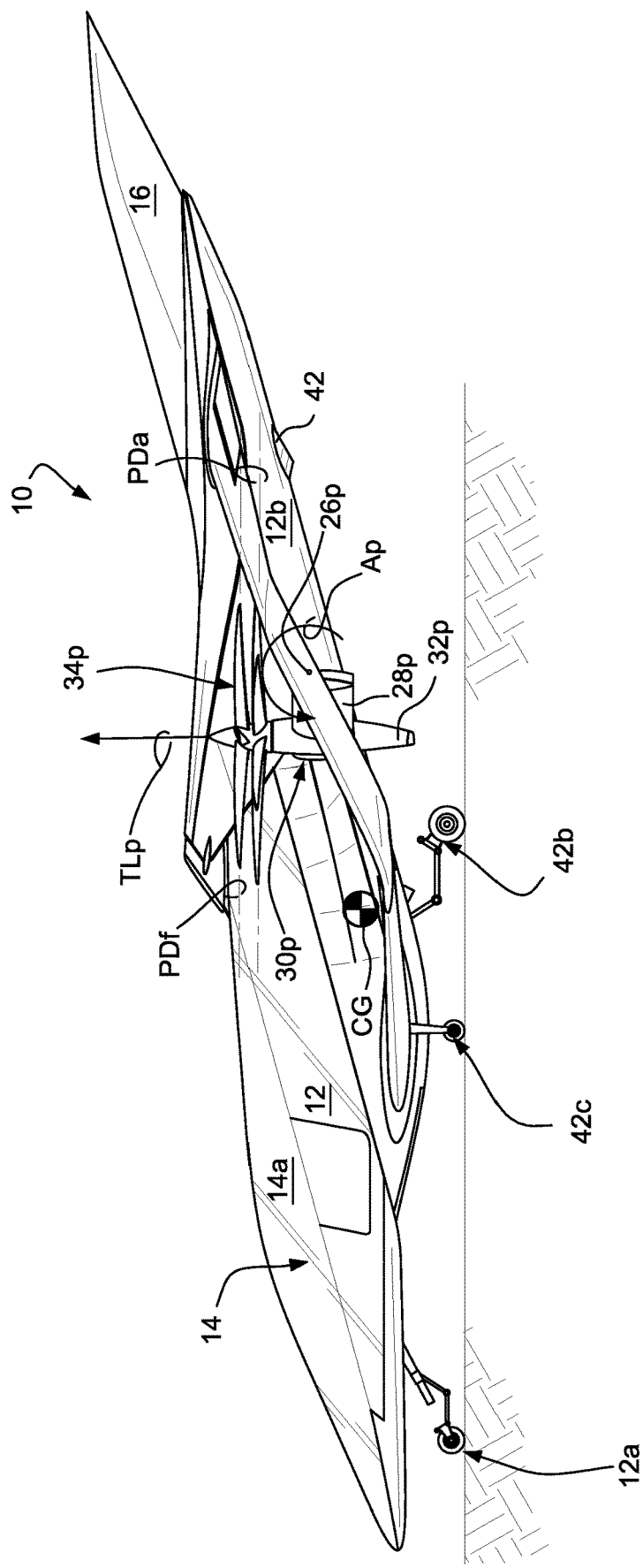
Figure 5:
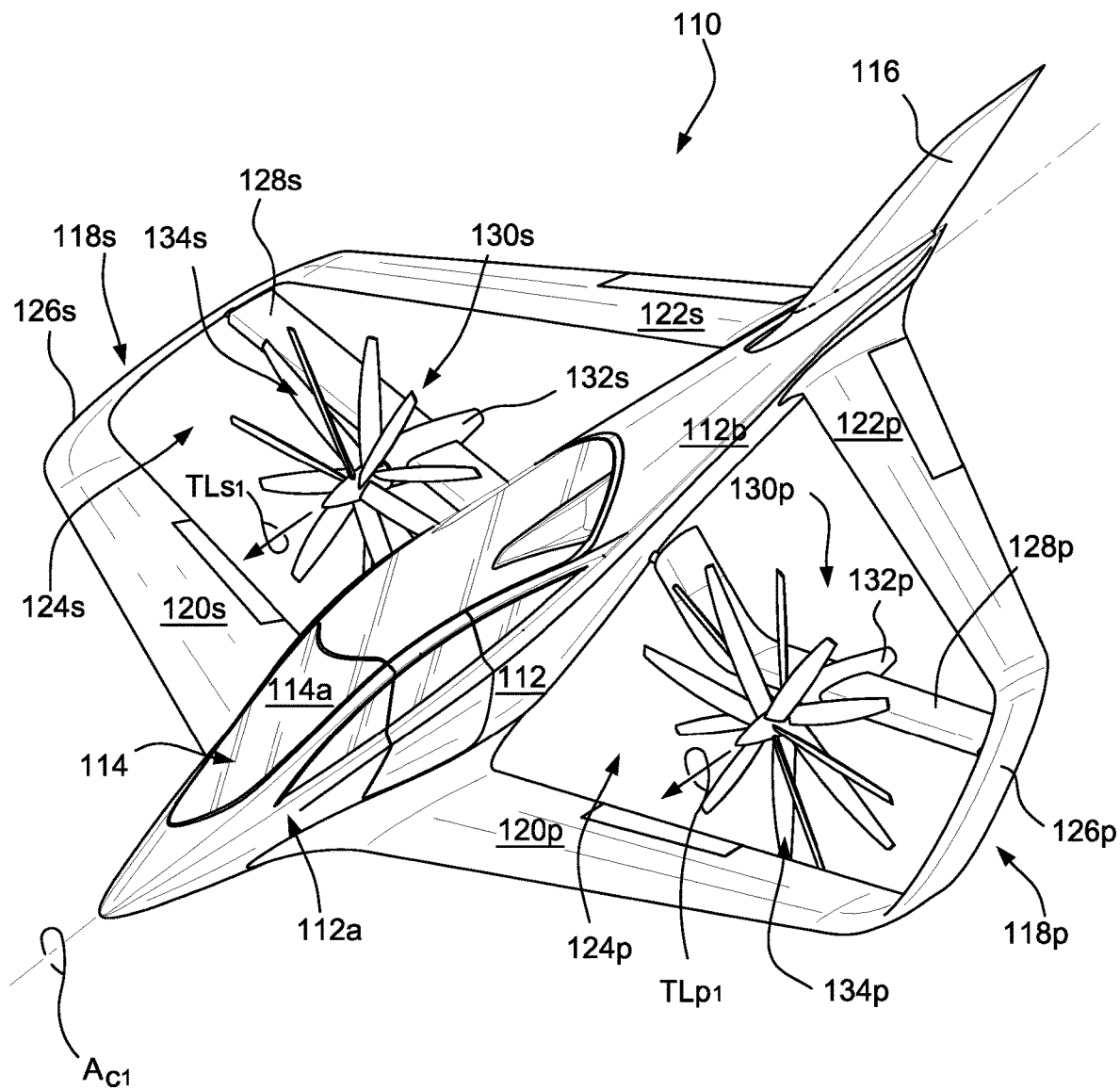
Figure 6:
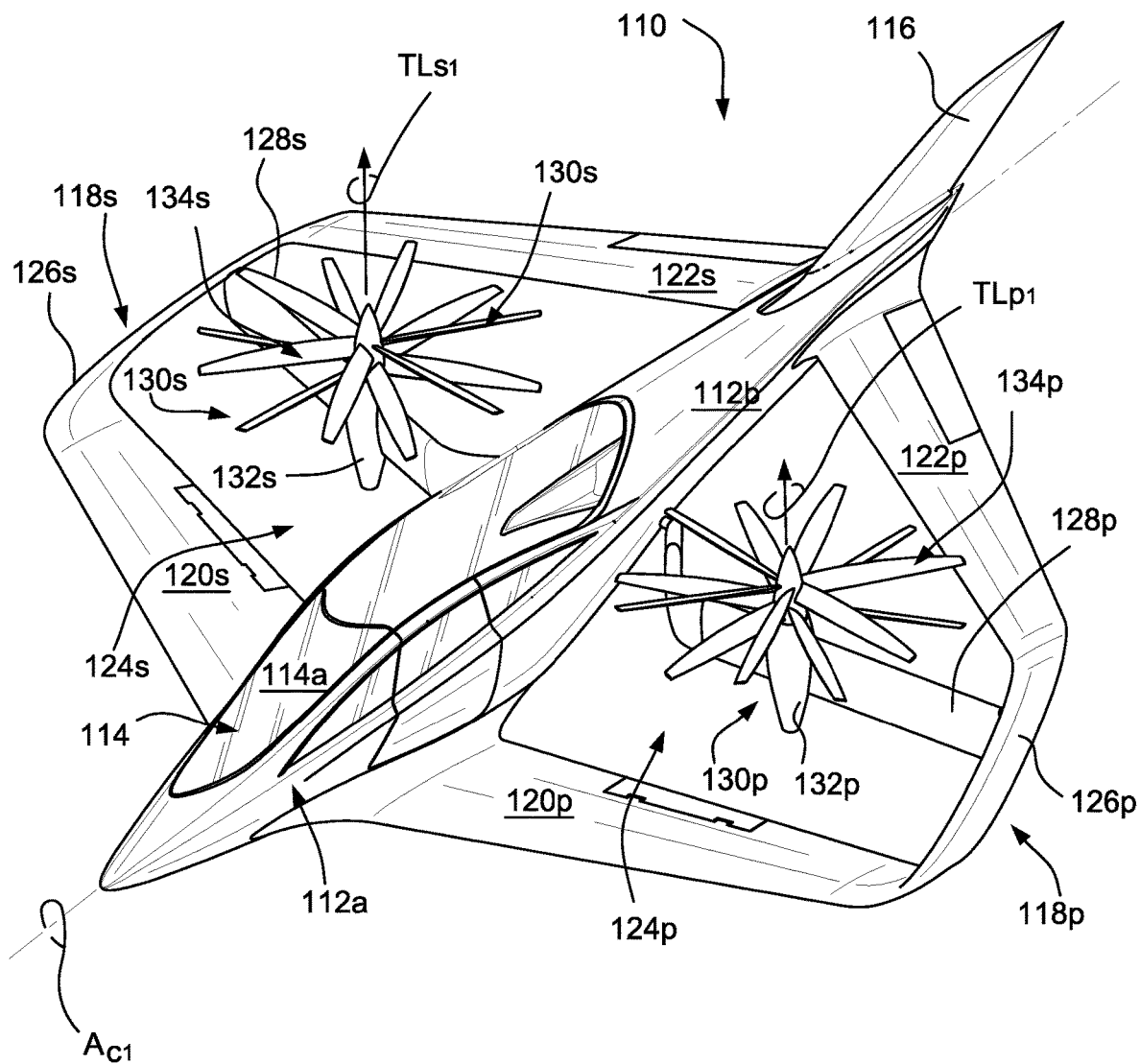
Figure 7:
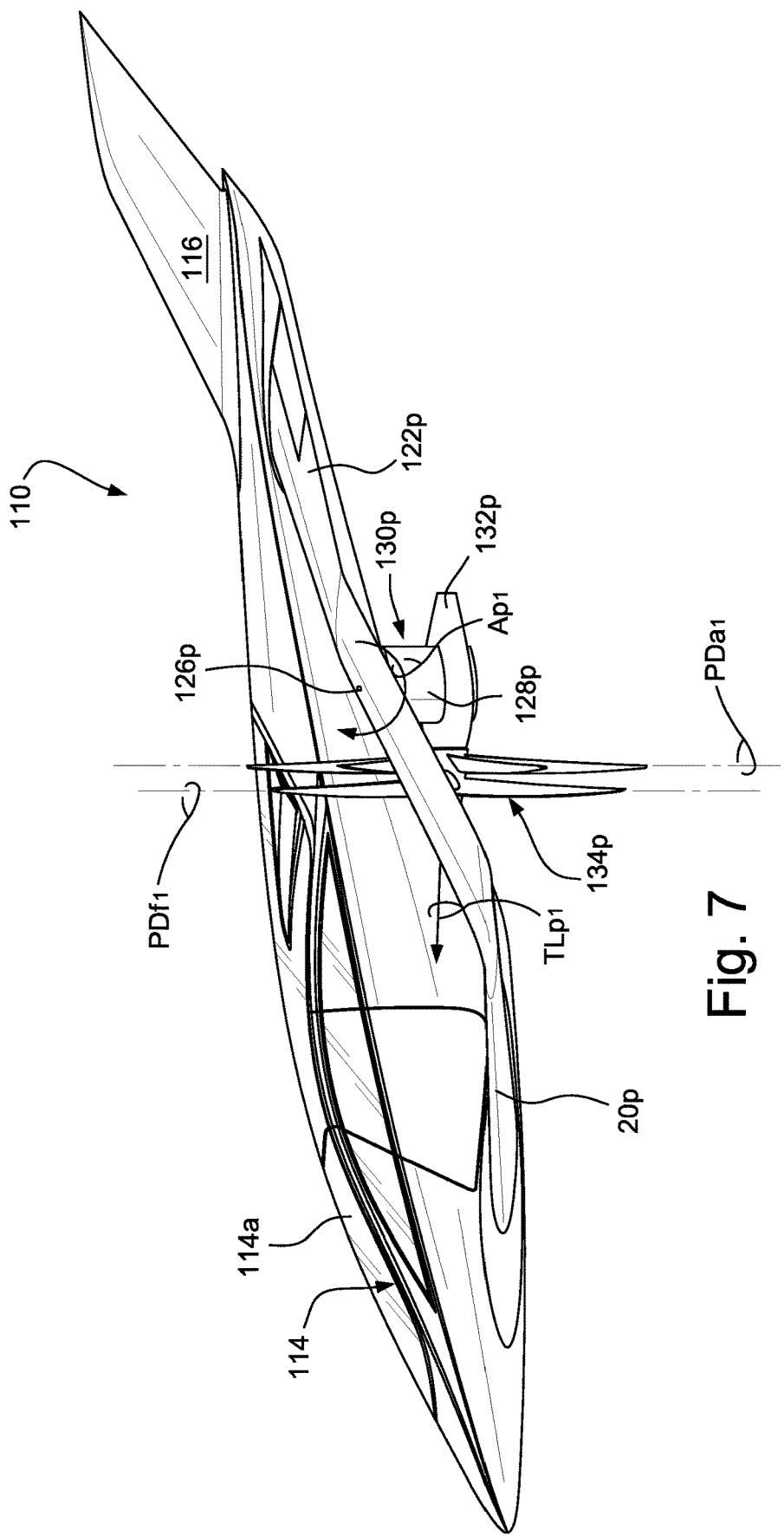

In order to assist with additional propulsion during horizontal flight modes, the aircraft 10 may be provided with a fuselage internal turbojet engine having a dorsally mounted air intake duct 40 and an aft thrust discharge duct 42 (see FIGS. 3 and 4). In addition, as shown in FIG. 4, the aircraft 10 may be provided with 4, the aircraft 10 may be provided with a retractable landing gear assembly comprised of forward and aft fuselage mounted landing gear 42a, 42b, respectively, and lateral wing stabilizing landing gear 42c provided with the port and starboard primary airfoils 20p, 20s (only one such stabilizing landing gear 42c associated with the airfoil 20p being visible in FIG. 4).

Another embodiment of a vertical and short takeoff and landing (VSTOL) aircraft 110 according to the invention is depicted in FIGS. 5-8. The aircraft 110 depicted in FIGS. 5-8 will include an elongate fuselage 112 which defines a central elongate axis Ac1 for the aircraft 110. The fuselage 112 includes an occupant cabin 114 which is covered by a transparent canopy 114a at a forward portion 112a of the fuselage 112 and a vertical stabilizer 116 extending upwardly from an aft empennage region 112b of the fuselage 112. The stabilizer 116 may be pivotally movable so as to provide yaw axis rudder control to the aircraft.

The aircraft 110 also includes port and starboard airfoil (wing) assemblies 118p, 118s which include fixed position port and starboard primary airfoils 120p, 120s extending outwardly from the forward region 112a of the fuselage 112 and fixed position port and starboard secondary empennage airfoils 122p, 122s extending outwardly from the aft empennage region 112b of the fuselage 112, respectively. A space 124p, 124s is therefore respectively defined between each of the port and starboard primary airfoils 120p, 120s and the associated port and starboard secondary empennage airfoils 122p, 122s. Port and starboard winglets 126p, 126s integrally join the respective terminal ends of the port and starboard primary airfoils 120p, 120s and the associated terminal ends of the port and starboard secondary empennage airfoils 122p, 122s to thereby establish a lateral structural boundary to the defined spaces 124p, 124s, respectively.

Port and starboard intermediate airfoils 128p, 128s are pivotally connected at a proximal end to the fuselage 112 and at a distal end to a respective one of the winglets 126p, 126s so as to be capable of reciprocal pivotal movements (arrows Ap1 in FIGS. 7 and 8) about a substantially horizontal pivot axis thereof. Port and starboard propulsion units 130p, 130s are respectively supported by the pivotable intermediate airfoils 128p, 128s and respectively include an engine 132p, 132s and coaxially counter-rotatable sets of non-cyclic controlled but constant speed selectable propeller blades 134p, 134s each defining forward and aft propeller disc planes PDf1, PDa1 (see FIGS. 7 and 8). The propeller discs planes PDf1, PDa1 thereby establish thrust lines TLp1, TLs1 for each of the port and starboard coaxially counter-rotatable sets of propeller blades 134p, 134s, respectively. The propwash from the propeller blades 134p, 134s will moreover flow across the respective intermediate airfoils 128p, 128s so as to provide lift component in relation of the pivot angle thereof.

In order to provide a balancing moment to the center of gravity (CG) (see FIGS. 7 and 8) and misalignment of the thrust lines TLp1, TLs1, the airfoil shape of the intermediate airfoils 128p, 128s aft of the rotor plane of the discs PDf1 PDa1 will have its zero lift angle adjusted with respect of the thrust lines TLp1, TLs1 and will use the rotor wash dynamic pressure and angle to create lift and drag forces made necessary by such adjustment. The aircraft flight control system (not shown) will therefore adjust the zero lift line of the intermediate airfoils 128p, 128s with respect of the thrust lines TLp1, TLs1, respectively, to maintain the selected attitude of the aircraft during hover and transition to wing borne level flight. In such a manner, therefore, the aircraft 110 is provided with enhanced stability during transitions between vertical and horizontal flight modes.

Figure 8:
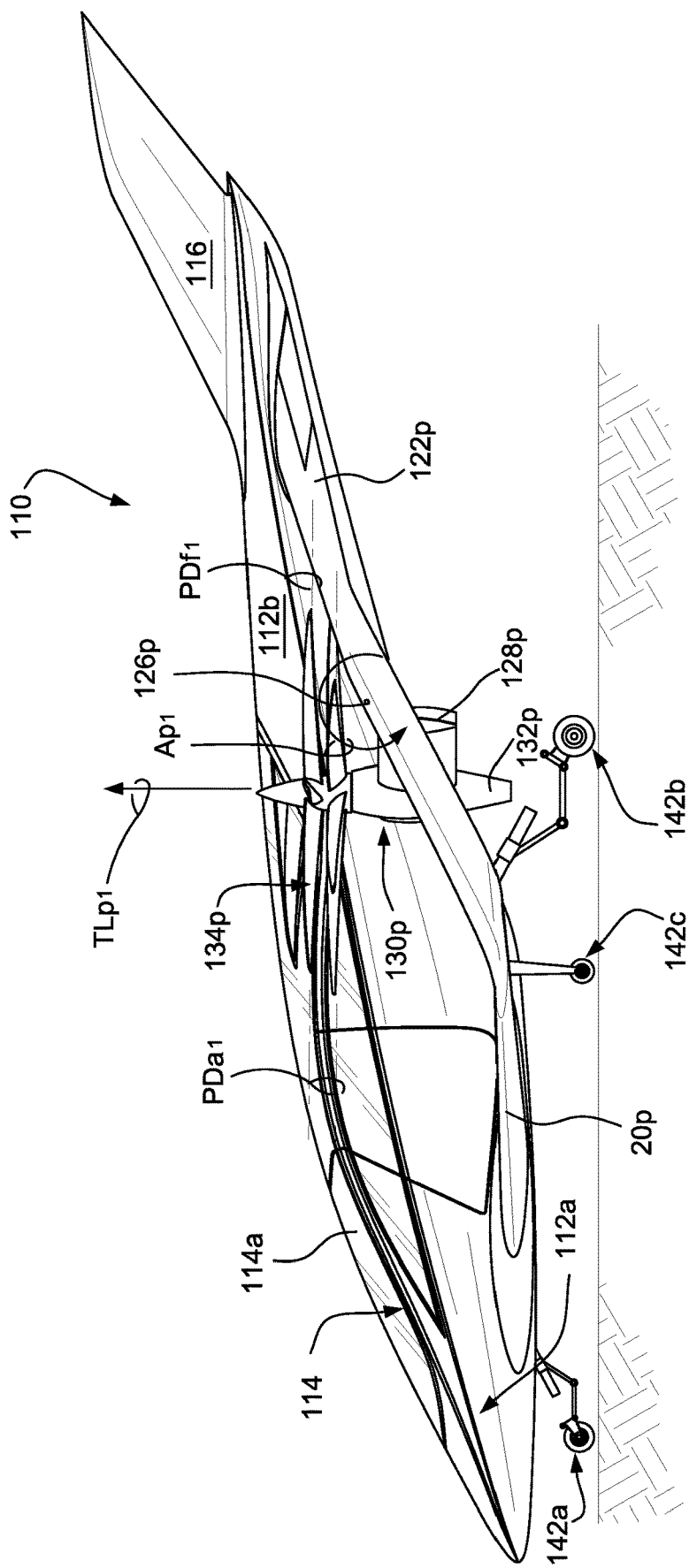

As shown in FIG. 8, the aircraft 110 may be provided with a retractable landing gear assembly comprised of forward and aft fuselage mounted landing gear 142a, 142b, respectively, and lateral wing stabilizing landing gear 142c provided with the port and starboard primary airfoils 120p, 120s (only one such stabilizing landing gear 142c associated with the airfoil 120p being visible in FIG. 8).

Yet another embodiment of a vertical and short takeoff and landing (VSTOL) aircraft 210 according to the invention is depicted in FIGS. 9-12. The aircraft 210 depicted in FIGS. 9-12 includes an elongate fuselage 212 which defines a central elongate axis Ac2 for the aircraft 210. The fuselage 212 includes an occupant cabin 214 which is covered by a transparent canopy 214a at a forward portion 212a of the fuselage 212 and a vertical stabilizer 216 extending upwardly from an aft empennage region 212b of the fuselage 212. The stabilizer 216 may be pivotally movable so as to provide yaw axis rudder control to the aircraft.

The aircraft 210 also includes port and starboard airfoil (wing) assemblies 218p, 218s which include fixed position port and starboard primary airfoils 220p, 220s extending outwardly from the forward region 212a of the fuselage 212 and pivotally moveable gull-wing configured port and starboard secondary empennage airfoils 222p, 222s extending outwardly from the aft empennage region 212b of the fuselage 212, respectively. Each of the gull-wing configured port and starboard secondary empennage airfoils 222p, 222s includes an inboard section 222p1, 222s1 that extends outwardly and upwardly from the fuselage 212 and an outboard section 222p2, 222s2 that extends outwardly from a terminal end of the inboard section 222p1, 222s1 to the winglet 226p, 226s, respectively. A space 224p, 224s is therefore respectively defined between each of the port and starboard primary airfoils 220p, 220s and the associated port and starboard secondary empennage airfoils 222p, 222s.

Port and starboard winglets 226p, 226s integrally join the respective terminal ends of the port and starboard primary airfoils 220p, 220s and the associated terminal ends of the port and starboard secondary empennage airfoils 222p, 222s to thereby establish a lateral structural boundary to the defined spaces 224p, 224s, respectively.

A proximal end of the secondary empennage airfoils 222p, 222s is pivotally connected to the aft portion 212b of the fuselage 212 while a distal end thereof are pivotally connected to an upper end of the winglets 226p, 226s, respectively, so as to be capable of reciprocal pivotal movements (arrows Ap2 in FIGS. 11 and 12) about a substantially horizontal pivot axis thereof.

Port and starboard propulsion units 230p, 230s are respectively fixed to and supported by the engine mounts 231p, 231s to an underside of the pivotable empennage airfoils 222p, 222s, respectively. Each of the propulsion units 230p, 230s is therefore reciprocally pivotally moveable with the respective empennage airfoils 222p, 222s in the direction of the arrows Ap2 in FIGS. 11 and 12.

Each of the propulsion units 230p, 230s respectively includes an engine 232p, 232s and coaxially counter-rotatable sets of non-cyclic controlled but constant speed selectable propeller blades 234p, 234s each defining forward and aft propeller disc planes PDf2, PDa2 (see FIGS. 11 and 12). The propeller discs planes PDf2, PDa2 thereby establish thrust lines TLp2, TLs2 for each of the port and starboard coaxially counter-rotatable sets of propeller blades 234p, 234s, respectively. The propwash from the propeller blades 234p, 234s will moreover flow across the empennage airfoils 222p, 222s so as to provide lift component in relation of the pivot angle thereof.

In order to provide a balancing moment to the center of gravity (CG) (see FIGS. 11 and 12) and misalignment of the thrust lines TLp2, TLs2, the airfoil shape of the empennage airfoils 222p, 222s aft of the rotor plane of the discs PDf2 PDa2 will have its zero lift angle adjusted with respect of the thrust lines TLp2, TLs2 and will use the rotor wash dynamic pressure and angle to create lift and drag forces made necessary by such adjustment. The aircraft flight control system (not shown) will therefore adjust the zero lift line of the empennage airfoils 222p, 222s with respect of the thrust lines TLp2, TLs2, respectively, to maintain the selected attitude of the aircraft during hover and transition to wing borne level flight. In such a manner, therefore, the aircraft 210 is provided with enhanced stability during transitions between vertical and horizontal flight modes.

In order to assist with additional propulsion during horizontal flight modes, the aircraft 210 may be provided with a fuselage internal turbojet engine having a dorsally mounted air intake duct 240 and an aft thrust discharge duct 242 (see FIGS. 11 and 12). In addition, as shown in FIG. 12, the aircraft 210 may be provided with a retractable landing gear assembly comprised of forward and aft fuselage mounted landing gear 242a, 242b, respectively, and lateral wing stabilizing landing gear 242c provided with the port and starboard primary airfoils 220p, 220s (only one such stabilizing landing gear 242c associated with the airfoil 220p being visible in FIG. 12).

FIGS. 13-16 depict an embodiment whereby the aircraft 10 as depicted in FIGS. 1-4 may have its occupant cabin 14 converted to a roadable vehicle 300. It will be understood, however, that the discussion which follows could apply similarly with respect to the embodiments of the aircraft 110 and 210 described previously in connection with FIGS. 5-12 to thereby obtain a roadable vehicle 300. It will also be understood that, the retractable landing gear 42a-42c for the aircraft 10 have not been depicted in FIGS. 13-16 in the interests of clarity of presentation.

Conversion of the occupant cabin 14 of the aircraft 10 is initiated by opening the canopy cover 14a so as to expose the occupant cabin 14 and its transparent occupant canopy 14a' (which is normally covered by the canopy cover 14a during flight operations) and positioning a ground-based wheeled cradle assembly 302 at the front of the aircraft 10. The cradle assembly 302 may then be maneuvered into proper position (e.g., by ground crew) so it can be removably latched and secured to the front of the occupant cabin 14 (e.g., by suitable latching mechanisms which are not shown). The now wheeled occupant cabin 14 and its occupant canopy 14a' can be separated and rolled away from the interior of the fuselage 12 by deployment of a retractable rear wheel assembly 304 associated at the rear of the occupant cabin 14. A moveable forward ramp 306 associated with the forward portion 12a of the fuselage 12 may be lowered in front of the nose wheel assembly 42a of the aircraft 10 so as to allow the now roadable vehicle 300 to depart the vicinity of the fuselage 12. In this regard, motive power may be provided to the forward drive wheels 302a of the cradle assembly 302 by suitable electrical drive motors and an associated battery system (not shown) self-contained by the cradle assembly 302. In order to reassemble the occupant cabin with the fuselage 12, the procedures outlined above may be reversed so as to once again prepare the aircraft 10 for VSTOL flight.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A vertical and short takeoff and landing (VSTOL) aircraft comprising:
   an elongate aircraft fuselage which includes a transparent canopy cover moveably mounted to the fuselage between open and closed conditions and defines a longitudinal axis of the aircraft;
   a cabin component for aircraft occupants having a transparent occupant canopy, the cabin component being detachably mounted to the aircraft fuselage so as to allow separation of the cabin component and the occupant canopy thereof from the fuselage when the transparent canopy cover operatively associated with the aircraft fuselage is moved into the opened condition thereof; and
   a wheeled cradle assembly removably attachable to a forward portion of the cabin component to allow the cabin component and the occupant canopy to be roadable following separation from the fuselage in a forward direction along the longitudinal axis of the aircraft,
   a vertical stabilizer positioned at an aft region of the aircraft fuselage;
   port and starboard airfoil assemblies extending outwardly from the fuselage; and
   port and starboard propulsion units, wherein each of the port and starboard airfoil assemblies comprises:
   (i) primary airfoils extending outwardly from a forward region of the aircraft fuselage, and
   (ii) secondary empennage airfoils extending outwardly from an aft region of the aircraft fuselage and separated from the primary airfoils along the longitudinal axis of the aircraft so as to define a space therebetween, and wherein
   each of the port and starboard propulsion units comprises an engine and propellers operably driven by the engine to provide thrust to the aircraft along a thrust line, and wherein
   the engine and propellers are mounted for pivotal movement within the defined space between the primary airfoil and the secondary empennage airfoils so as to achieve a first operational position wherein the thrust line of the propellers is orientated substantially parallel to the longitudinal axis of the fuselage and a second operational position wherein the thrust line of the propellers is oriented substantially perpendicular to the longitudinal axis of the aircraft, and wherein
   each of the port and starboard airfoil assemblies further comprises winglets connecting respective terminal ends of the primary airfoils and secondary empennage airfoils so as to provide a lateral boundary to the space defined therebetween, and wherein
   each of the port and starboard airfoil assemblies further comprises an intermediate airfoil extending in the defined space between the primary airfoil and secondary empennage airfoil, wherein
   each intermediate airfoil is pivotally connected at proximal and distal ends thereof to the fuselage and a respective winglet so as to be capable of reciprocal pivotal movements about a substantially horizontal pivot axis, and wherein
   each of port and starboard propulsion units is operably supported by a respective intermediate airfoil so as to pivotable therewith between the first and second operational positions, and wherein
   the cradle assembly includes a pair of driven wheels to propel the cabin along a surface when the cabin component is separated from the fuselage and is roadable, and wherein
   the detachably mounted cabin component includes retractable aft road wheels which are deployable to allow the cabin component to be moved forwardly away from the aircraft fuselage along the longitudinal axis of the aircraft, and wherein
   a forward portion of the fuselage includes a ramp which is moveable to a lowered condition to allow the aft road wheels of the cabin component to be rolled along the ramp when the cabin component is moved forwardly away from the aircraft fuselage thereby allowing the cabin component to separate from the aircraft.

2. The VSTOL aircraft according to claim 1, wherein the aircraft has an aircraft center of gravity (CG), and wherein each of the port and starboard propulsion assemblies is mounted at a position which is aft of the aircraft CG.

3. The VSTOL aircraft according to claim 1, wherein the propellers of each of the port and starboard propulsion units includes first and second sets of propellers that counter-rotate relative to one another.

4. The VSTOL aircraft according to claim 1, wherein the aircraft fuselage comprises a detachable cabin component for aircraft occupants that allows separation of the cabin component from the fuselage.

5. The VSTOL aircraft according to claim 4, further comprising a wheeled cradle assembly removably attachable to the cabin component to allow the cabin component to be roadable upon separation from the fuselage.

6. The VSTOL aircraft according to claim 5, wherein the cradle assembly includes a pair of driven wheels to propel the cabin along a surface when the cabin component is separated from the fuselage and roadable.

7. An aircraft having a roadable occupant cabin comprising:
  an elongate aircraft fuselage which includes a transparent canopy cover moveably mounted to the fuselage between open and closed conditions and defining a longitudinal axis of the aircraft;
  a cabin component for aircraft occupants having a transparent occupant canopy, the cabin component being detachably mounted to the aircraft fuselage so as to allow separation of the cabin component and the occupant canopy thereof from the fuselage when the transparent canopy cover operatively associated with the aircraft fuselage is moved into the opened condition thereof; and
  a wheeled cradle assembly removably attachable to a forward portion of the cabin component to allow the cabin component and the occupant canopy to be roadable following separation from the fuselage in a forward direction along the longitudinal axis of the aircraft, wherein
  the cradle assembly includes a pair of driven wheels to propel the cabin along a surface when the cabin component is separated from the fuselage and is roadable, and wherein
  the detachably mounted cabin component includes retractable aft road wheels which are deployable to allow the cabin component to be moved forwardly away from the aircraft fuselage along the longitudinal axis of the aircraft, and wherein
  a forward portion of the fuselage includes a ramp which is moveable to a lowered condition to allow the aft road wheels of the cabin component to be rolled along the ramp when the cabin component is moved forwardly away from the aircraft fuselage thereby allowing the cabin component to separate from the aircraft.

8. The aircraft according to claim 7, wherein the aircraft further comprises:
  a vertical stabilizer positioned at an aft region of the aircraft fuselage;
  port and starboard airfoil assemblies extending outwardly from the fuselage; and
  port and starboard propulsion units.

9. The aircraft according to claim 8, wherein
  each of the port and starboard airfoil assemblies comprises:
    (i) primary airfoils extending outwardly from a forward region of the aircraft fuselage, and
    (ii) secondary empennage airfoils extending outwardly from an aft region of the aircraft fuselage and separated from the primary airfoils along the longitudinal axis of the aircraft so as to define a space therebetween, and wherein
  each of the port and starboard propulsion units comprises an engine and propellers operably driven by the engine to provide thrust to the aircraft along a thrust line, and wherein
  the engine and propellers are mounted for pivotal movement within the defined space between the primary airfoil and the secondary empennage airfoils so as to achieve a first operational position wherein the thrust line of the propellers is orientated substantially parallel to the longitudinal axis of the fuselage and a second operational position wherein the thrust line of the propellers is oriented substantially perpendicular to the longitudinal axis of the aircraft.

10. The aircraft according to claim 9, wherein each of the port and starboard airfoil assemblies further comprises winglets connecting respective terminal ends of the primary airfoils and secondary empennage airfoils so as to provide a lateral boundary to the space defined therebetween.

11. The aircraft according to claim 8, wherein the aircraft has an aircraft center of gravity (CG), and wherein each of the port and starboard propulsion assemblies is mounted at a position which is aft of the aircraft CG.

12. The aircraft according to claim 9, wherein each of the port and starboard airfoil assemblies further comprises a pivotable intermediate airfoil extending in the defined space between the primary airfoil and secondary empennage airfoil, and wherein each of port and starboard propulsion units is operably supported by a respective intermediate airfoil so as to pivotable therewith between the first and second operational positions.

13. The aircraft according to claim 9, wherein each secondary empennage airfoil of the port and starboard airfoil assemblies is pivotable, and wherein each of each of the port and starboard propulsion units is operably supported by a respective secondary empennage airfoil so as to be pivotable therewith between the first and second operational positions.

14. A method of converting an aircraft cabin to a roadable vehicle comprising the steps of:
  (a) providing the aircraft according to claim 7;
  (b) separating the detachably mounted cabin component from the aircraft fuselage;
  (c) positioning the wheeled cradle assembly under the detachably mounted cabin component; and thereafter
  (d) moving the cabin component away from the aircraft fuselage by moving the wheeled cradle assembly across ground surface.

15. The method according to claim 14, wherein the detachably mounted cabin component includes retractable aft road wheels, and wherein step (d) includes deploying the aft road wheels to allow the cabin component to be moved away from the aircraft fuselage.

16. A vertical and short takeoff and landing (VSTOL) aircraft comprising:
  an elongate aircraft fuselage which includes a transparent canopy cover moveably mounted to the fuselage between open and closed conditions and defines a longitudinal axis of the aircraft;
  a cabin component for aircraft occupants having a transparent occupant canopy, the cabin component being detachably mounted to the aircraft fuselage so as to allow separation of the cabin component and the occupant canopy thereof from the fuselage when the transparent canopy cover operatively associated with the aircraft fuselage is moved into the opened condition thereof; and
a wheeled cradle assembly removably attachable to a forward portion of the cabin component to allow the cabin component and the occupant canopy to be roadable following separation from the fuselage in a forward direction along the longitudinal axis of the aircraft,
a vertical stabilizer positioned at an aft region of the aircraft fuselage;
port and starboard airfoil assemblies extending outwardly from the fuselage; and
port and starboard propulsion units, wherein each of the port and starboard airfoil assemblies comprises:
  (i) primary airfoils extending outwardly from a forward region of the aircraft fuselage, and
  (ii) secondary gull-wing configured empennage airfoils having an inboard section extending outwardly and upwardly from an aft region of the aircraft fuselage and an outboard section that extends outwardly from a terminal end of the inboard section, the secondary gull-wing configured empennage airfoils being separated from the primary airfoils along the longitudinal axis of the aircraft so as to define a space therebetween, and wherein
each of the port and starboard propulsion units comprises an engine and propellers operably driven by the engine to provide thrust to the aircraft along a thrust line, and wherein
each of the port and starboard airfoil assemblies further comprises winglets at a terminal end of the port and starboard primary airfoils to connect respective terminal ends of the port and starboard primary airfoils and the terminal ends of the outboard sections of the port and starboard secondary gull-wing configured empennage airfoils so as to provide a lateral boundary to the space defined therebetween, and wherein
each of the inboard sections of the port and starboard secondary gull-wing configured empennage airfoils is pivotally connected at a proximal end thereof to an aft portion of the fuselage, and wherein
each of the outboard sections of the port and starboard secondary gull-wing configured empennage airfoils is pivotally connected at a distal end thereof to a respective winglet so that the port and starboard secondary gull-wing configured airfoils are capable of pivotal movements about a substantially horizontal pivot axis between first and second operational positions, and wherein
each of the port and starboard propulsion units are mounted to the outboard sections of the secondary gull-wing configured empennage airfoils within the defined space between the primary airfoil and the secondary gull-wing configured empennage airfoils so as to be pivotable therewith between the first and second operational positions such that a thrust line of the propellers thereof is oriented substantially parallel to the longitudinal axis of the fuselage when the gull-wing configured empennage airfoils are in the first operational position, and the thrust line of the propellers thereof is oriented substantially perpendicular to the longitudinal axis of the aircraft when the gull-wing configured empennage airfoils are in the second operational position, and wherein
the cradle assembly includes a pair of driven wheels to propel the cabin along a surface when the cabin component is separated from the fuselage and is roadable, and wherein
the detachably mounted cabin component includes retractable aft road wheels which are deployable to allow the cabin component to be moved forwardly away from the aircraft fuselage along the longitudinal axis of the aircraft, and wherein
a forward portion of the fuselage includes a ramp which is moveable to a lowered condition to allow the aft road wheels of the cabin component to be rolled along the ramp when the cabin component is moved forwardly away from the aircraft fuselage thereby allowing the cabin component to separate from the aircraft.

\* \* \* \* \*